Jan. 18, 1944.  A. S. MARCHUS  2,339,746
FLEXIBLE CONDUIT APPARATUS
Filed March 8, 1941
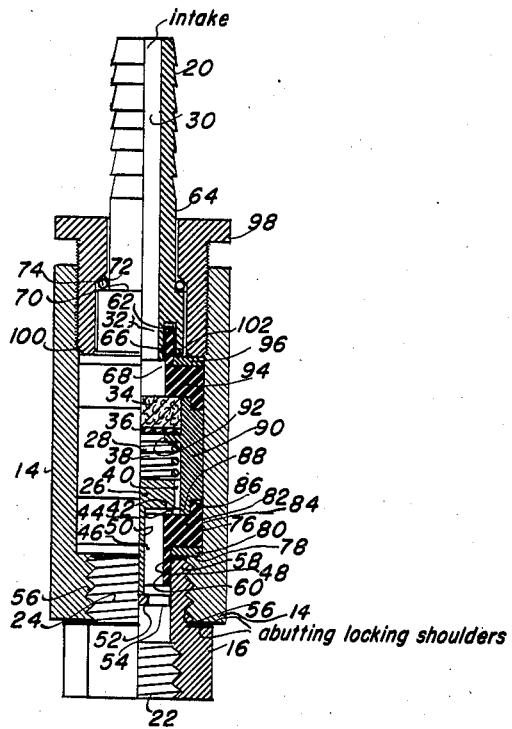
AMOS S. MARCHUS
INVENTOR.
BY
ATTORNEY Patented Jan. 18, 1944

2,339,746

UNITED STATES PATENT OFFICE 2,339,746

FLEXIBLE CONDUIT APPARATUS

Amos S. Marchus, Oakland, Calif., assignor to Amos H. Marchus, Oakland, Calif.

Application March 8, 1941, Serial No. 382,293

3 Claims. (Cl. 234—19)

This invention is concerned in general with spray gun and fluid conduit connections, being assimilable generally to yield one or more of its functions in various environments where fluid conduits are employed, permanently joined, occasionally disassembled, or frequently connected and disconnected.

It is desirable that the spray gun apparatus should exert as little force on the operator's hand as possible, since the operator employs it for long periods of time and often must extend the gun to arms length to reach the desired points, etc. It is one likely criterion for reduction of such unnecessary forces that the gun shall be freely rotatable about the axis of the hose to which it is connected, or that the hose be freely rotatable with respect to the gun. When so arranged, there can be no torsional reaction to be resisted by the operator when it chances that the gun must be placed in a position rotatively displaced with respect to any secured position. This arrangement also eliminates the tendency of the hose to form a coil incident to varied maneuvers of the nozzle, and maintains the hose at its full effective length without the need for pulling upon it by the operator to overcome the helical spring type tension developed in ordinary fixed connections.

Additionally the life of the hose is protected, and the need for tight connections at couplings is eliminated, such being necessary in flexible joints which transmit torsion. Thus, threaded coupling connections will not uncouple without the assertion of a twist upon them, and if no torsional stress is permitted to be transmitted to them, the couplings may be hand set without wrenches, and they need only produce fluid tightness, that is, they need not be strained to security against release by torsional stresses which would uncouple them if brought into play by hose-end turning.

One type of paint spraying outfit uses one hose to conduct air from a compressor source to the gun, and a paint reservoir is integrally connected to the gun. Different gun and paint reservoir combinations are usable to deliver different colors of paints and the same compressed air supply is used with each gun in turn.

It is desirable in outfits of this nature that the change from one gun to another be done as quickly as possible, without requiring the operator to first turn off a valve separate from the disconnecting apparatus. It is, moreover, desirable to provide for disconnecting and connecting the guns from the air hose while under pressure with ease and without tools. It is likewise desirable to provide for such connection and disconnection without rotating the gun with respect to the hose, although by this invention such connections may optionally be effected by rotating the gun with respect to the hose with which it is connected.

This invention furnishes in apparatus of the nature referred to those desirable characteristics pointed out, making also for ease and speed in the connection and disconnection of conduits, and in addition, provides other advantages which will appear in the following specification referring to the drawing in which the single figure is a view, partially in section and partially in whole of the parts of an assembled combination swivel coupling and valve.

The manner and means of connection of the gun to the hoses is accomplished by this invention without tribute of attention to pressure within the hoses. Where many paint spray guns are employed electively with the same coupling, the invention desirably achieves the object of making it possible for the operator to, when making a change, simply make the disconnection above described, eliminating separate steps of shutting off the source of air pressure, or the source of fluid controlled, and without requiring a definite order of cut off, as that the paint supply be cut off first. Thus, when the operator desires to replace gun, he simply rotates fitting 14. This first closes a valve within the coupling which confines the pressure within the hose. Continued rotation of 14 effects the disconnection. This may be done by the left hand, while spraying continues with the gun in the right hand. By placing the valve within the coupling, that is, on the hose, no trigger is necessary in many cases since the valve in the coupling is adequate to control the ratio of air to paint, or the velocity of discharge. The coupling valve is both a shut off valve and a throttle valve as well as a disconnecting valve, easily operated by the thumb and index finger, and yet which, when the member 14 is not twisted with a certain minimum force, is positively held in a definite control position. For this reason the rate of discharge may be constant, yet instantly varied at will and with ease.

In this figure, a conventional tubular stem ended member 20 is provided which is received in and secured to a hose (not shown) in a conventional manner. Detachable fittings 16 are provided which form adapters for guns or the like, and which are relatively permanently securable to such guns. The connection 22 of fitting 16 may, therefore, take any form, or may be integral with parts of a gun. At the coupling side of the fitting 16, which may be called the gun or nozzle connection 24, the fittings 16 are uniform so that all cooperate with the hose end coupling for the purposes herein described.

By rotating the cylindrical body member 14, with elements 16 and 20 stationary, all of the other elements not integral therewith, rotate together, while elements 16, and the valve elements, that is, valve 26 and spring 28 may move into and out of member 14, that is, longitudinally therein. In the positions of the parts, they are connected for fluid passage, and the valve is, substantially fully, open, so that fluid under pressure received at the intake 30 passes via: stem passage 30, past a friction-free-under-pressure rotating fluid seal 32, through fluid filter felt disc 34 and wire screen 36, through valve chamber 38, passages 40, past valve 26, valve face 42 and valve seat 44, through passage 46 of the discharge seal 48 along valve stem 50, into the fitting 16, through openings 52 in valve stem depressor web 54.

The pressure of the fluid within the coupling prevents escape of the fluid, the packings being such at both 32 and 48, that members 16 and 20, or either of them, may remain stationary while the remainder of the structure rotates freely. Fitting 16 being stationary and disconnected, engagement of internal thread 56 with the first threads 24 serves simply to connect the parts, no seal yet being effected. The tip 58 of fitting 16, after being sufficiently engaged to establish concentricity and alignment of the parts but before opening the valve, telescopes over the exterior of elastic rubber sealing sleeve extension lip 60, the exterior surface of which is cylindrically concentric of the concentric interior of the portion 58 of the fitting 16. Lip 60 and portion 56 of body 14 form a second annular groove to receive said portion 58. Thus, pressure, when exerted on the extension 60, forces against the fitting to form a tight, though rotative seal; the rubber and metal, while being fluid tight, still permits the fitting to rotate by alternately twisting the rubber and allowing it to slip peripherally. The sensed action is of a series of jerks as rotation is forced, unless the seal is lubricated, as by graphite, when resistance is hardly detectable. After the telescopic relation is established the portion 54 of fitting 16 engages the valve and allows fluid passage by raising the valve off its seat. Full opening of the valve is secured through a small angle of turning of fitting 16, as 90 degrees, so that complete throttling action can be had with little relative movement between the extension 60 and the interior surface 48. This is contributed to by providing the peripherally disposed valve seat at 44 with a large fluid passage thereto and therefrom and providing so that slight longitudinal movement of the valve face 42 produces a large change in the opening.

The valve chamber 38 is as large in diameter as possible to provide for the valve action described, and minimize fluid flow resistance, an attempt being made to provide against substantial resistance in the connector other than incurred by the cleaner. If certain gases are to be discharged cleaned, the filter is needed.

Unless it is desired to operate the valve, the gun fitting 16 and element 14 rotate as a unit, because the friction at 48 is sufficient with the threaded fitting to ensure this and overcome or transmit any torque to the seal 32, the resistance of rotation of which is so slight that undesired relative rotation at 48 is avoided. A flexible rubber sleeve sealing extension 62 fixed to the member 14 telescopes within an interior concentric surface of the interior end of stem 64, and is expanded thereagainst by fluid pressure from within the passage, while permitting relative rotation between the stem and the extension 62. The stem 64 preferably also includes an extension 66 which telescopes within the elastic rubber extension lip 62 back through the surrounding well of which the extension 62 projects, to prevent rolling the same back by incoming fluid. Thus the seal progresses from the base 68, upward as illustrated, similarly with the action of extension 60. Fitting 16 locks with 14, 58 clearing 80.

The interior end of the stem 64 therefore, forms an annular well or groove for reception of the rubber extension 62, and into this well there is preferably also injected an inert-to-rubber lubricant, as graphite. The interior end of the stem 64 is also enlarged to provide medially thereof a small outwardly disposed bearing shoulder 70 disposed against a thrust bearing surface 72 of a gland like member 98 attached or integral with body 14, the friction of which may be further reduced by, for example, ball bearings 74.

The remainder of the construction is such as to facilitate manufacture and assembly to the end that economy and accuracy in assembly result. It is especially essential that the extensions 60 and 62 be cylindrical and centered upon their surrounding metal surface axes so that the pressure be uniform and that there be no opportunity for the extensions to become distorted. The radial thickness of these extensions should be uniform and sufficiently thin so that very slight pressure is ample to effect the seal, yet thick enough to prevent their bulging at the spacings between surrounding metal parts.

The body member 14 is externally, by preference, and internally cylindrical, the exterior being knurled to facilitate manipulation, and provides the interior counterbore 76 to provide a seating shoulder 78 interiorly thereof for holding the valve and other parts in place, the counterbore extending toward the assembly end and being provided with internal threading diametered at least equal to the bore diameter so that parts are made of the bore diameter for accurate centering coaxially thereof. The small or outlet end of the member 14 is internally threaded as large as necessary to provide a fitting end 48 of adequate capacity and strength, yet leaving a sufficient shoulder 78 to provide abutment for a larger shoulder formed by a shoulder washer 80 the internal diameter of which preferably equals that of 58 and forms a snug collar about extension 60. If shoulder 80 were made integral with 14, it would be difficult to machine and to assemble the remaining parts with it.

The shoulder forming washer 80 provides longitudinal abutment for the valve seat and fastening portion of the elastic rubber member 82 which provides the extension 60, the valve seat 44, and radial expansion seal at 84. Member 82 is of substantially the illustrated section radially entirely surrounding the bore axis, the inward annular extension 86 being provided with interior diameter to be accurately circular and centered by encircling the outward extension 88 of packing and valve locating sleeve 90, which sleeve fits slidingly within bore 76 and, in turn, provides a valve cylinder or bore forming chamber 38 for slidably directing valve 26, and further provides an internal shoulder 92 forming a spring seat disposed toward the valve, and filter seat disposed toward the supply. The ends of sleeve 90 are preferably identical, and the shoulder 92 should be placed midway between the ends so that discrimination is unnecessary in assembly.

Received over the other end of the sleeve 90 is a second rubber member 94, which may be identical with member 82 and which receives around its neck a shoulder forming washer 96 which is preferably identical with washer 80. The washer 96 is accurately positioned to give precisely necessary endwise compression of the parts in assembly, by engaging interior end of gland-like nut 98, which may be suitably stopped by a shoulder 100, thus to insure that the rim 102 clears the washer 96 and that the rim of extension 62 clears the bottom of the groove in the stem 64. As illustrated, the gland-like nut 98 provides for thrust bearing of the stem. It is found that with the construction of the figure carrying a hundred pounds of air pressure the assembly will spin from release through several rotations from twirling by the fingers.

It will be observed that the assembly of the parts is a matter only of dropping them into member 14 in the proper order, except as to the ball bearing type, as to which the bearing parts are inverted and displaced so that the balls can be dropped between the shank 64 into the surrounding space provided by the enlarged bore of nut 98.

I claim:

1. A flexible-hose connector device comprising: an assembly for relatively permanent connection to a conduit including; a cylindrical tubular member provided at one end with means for securement to a conduit against relative movement with respect thereto, provided at the other end with an endwise disposed annular groove, and provided on the medial portion of the exterior thereof with an annular shoulder disposed toward the first mentioned end thereof; said assembly further including a body portion, a flexible sealing member having an annular longitudinally extending lip extending into the annular groove of the first recited tubular member secured within said body portion to prevent passage of fluid between the sealing member and the body portion, an annular glandlike member having a shoulder forming cylindrical interior fitting about the medial portion of said first cylindrical tubular member to provide an endwise thrust bearing relation therewith and secured to said body member to retain said first member in free rotational fluid sealing relation with said body member, said assembly further including in said body a fluid passage communicating with said tubular member and means for connecting said fluid passage to a second fluid conduit.

2. A construction according to claim 1 wherein said last named means includes a sealing member fastened within said body member against fluid passage therebetween and having an annular lip portion forming with the body portion an annular groove disposed in the direction of the second conduit, and wherein said body portion further includes means for positioning said second conduit with an annular portion thereof disposed within said second groove.

3. A construction according to claim 1 wherein said last named means includes a connector sealing member having an annular lip portion forming with the body portion an annular groove surrounding the fluid passage, means for positioning a second conduit in said second annular groove so that said lip lies within said second conduit, and a valve within said body portion arranged to close before the lip and such second conduit pass from telescoping relation.

AMOS S. MARCHUS.